United States Patent
Park et al.

(10) Patent No.: US 12,004,039 B2
(45) Date of Patent: Jun. 4, 2024

(54) METHOD AND APPARATUS FOR CONFIGURING SESSION IN WIRELESS COMMUNICATION SYSTEM

(71) Applicant: Samsung Electronics Co., Ltd., Gyeonggi-do (KR)

(72) Inventors: Jungshin Park, Gyeonggi-do (KR); Youngkyo Baek, Gyeonggi-do (KR); Hoyeon Lee, Gyeonggi-do (KR); Sangsoo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/584,830

(22) Filed: Jan. 26, 2022

(65) Prior Publication Data
US 2022/0240152 A1  Jul. 28, 2022

(30) Foreign Application Priority Data
Jan. 26, 2021 (KR) .................. 10-2021-0011101

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0077* (2013.01); *H04W 60/04* (2013.01); *H04W 76/10* (2018.02)

(58) Field of Classification Search
CPC . H04W 36/32; H04W 36/0077; H04W 60/04; H04W 76/10; H04W 76/12;
(Continued)

(56) References Cited

U.S. PATENT DOCUMENTS

2017/0142591 A1   5/2017  Vrzic
2019/0124561 A1   4/2019  Faccin et al.
(Continued)

FOREIGN PATENT DOCUMENTS

EP   3 739 965   11/2020
EP   3 996 423    5/2022
(Continued)

OTHER PUBLICATIONS

NTT DOCOMO, "Support of Inter-RAT HO from NR SA to EN-DC", S2-2002095, 3GPP TSG-SA WG2 Meeting #137e, Feb. 24-27, 2020, 7 pages.
(Continued)

*Primary Examiner* — Luat Phung
(74) *Attorney, Agent, or Firm* — The Farrell Law Firm, P.C.

(57) ABSTRACT

The disclosure relates to a 5th generation (5G), pre-5G, or 6th generation (6G) communication system for supporting higher data rates after a fourth generation (4G) communication system such as long term evolution (LTE). A method of a mobility management entity in a wireless communication system includes receiving an attach request for a first network among at least two networks supported by the UE including first capability information including information related to a second network among the at least two networks is, transmitting an attach response indicating completion of attach of the first network to the UE, receiving, from the UE, a session establishment request for the first network after transmitting the attach response, and establishing a session for the first network of the UE through a session management entity supporting mobility between the first network and the second network.

14 Claims, 14 Drawing Sheets

(51) Int. Cl.
*H04W 60/04* (2009.01)
*H04W 76/10* (2018.01)

(58) Field of Classification Search
CPC ..... H04W 8/24; H04W 36/14; H04W 60/005;
H04W 76/11; H04W 76/15; H04W 88/06;
H04W 8/02; H04W 8/22; H04W 80/10;
H04W 92/02
See application file for complete search history.

(56) References Cited

U.S. PATENT DOCUMENTS

| | | |
|---|---|---|
| 2020/0187301 A1 | 6/2020 | Park et al. |
| 2020/0196231 A1 | 6/2020 | Song et al. |
| 2020/0389830 A1 | 12/2020 | Park et al. |
| 2021/0014738 A1 | 1/2021 | Hoffner et al. |
| 2021/0168704 A1 | 6/2021 | Kawasaki et al. |

FOREIGN PATENT DOCUMENTS

| | | |
|---|---|---|
| WO | WO 2019/078683 | 4/2019 |
| WO | 2021/008313 | 1/2021 |

OTHER PUBLICATIONS

Huawei, HiSilicon, "Mobility Registration for Inter-RAT Movement", C1-205480, 3GPP TSG-CT WG1 Meeting #125-e, Aug. 20-28, 2020, 13 pages.
International Search Report dated Apr. 29, 2022 issued in counterpart application No. PCT/KR2022/001388, 6 pages.
European Search Report dated Apr. 9, 2024 issued in counterpart application No. 22746225.6-1215, 13 pages.

METHOD AND APPARATUS FOR CONFIGURING SESSION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0011101, filed on Jan. 26, 2021, in the Korean Intellectual Property Office, the disclosure of which is incorporated herein by reference in its entirety.

BACKGROUND

1. Field

The disclosure relates to a method and an apparatus for configuring a session in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system.

The 5G communication system is considered to be implemented in higher frequency (mmWave) bands (e.g., 60 GHz bands) so as to accomplish higher data rates. To decrease propagation loss of the radio waves and increase transmission distance, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered as an example of convergence of the 5G technology with the IoT technology.

As described above, development of wireless communication systems has been followed by a need for a method for operating a user equipment (UE) so as to maintain a session in an environment in which different generations of wireless communication systems coexist.

SUMMARY

It is an aspect of the disclosure to provide a method and an apparatus for configuring a session in a wireless communication system.

It is another aspect of the disclosure to provide a method and an apparatus for configuring a session in a wireless communication system that supports multiple radio access technologies (RATs).

Another aspect of the disclosure provides a method and an apparatus for transmitting/receiving UE capability information in a wireless communication system that supports multiple RATs.

According to an embodiment, a mobility management apparatus in a wireless communication system is provided that includes a transceiver; and at least one controller configured to control the transceiver, and configured to receive an attach request including first capability information including information related to a first network in an enabled state among at least two networks supported by the UE and information indicating that a second network among the at least two networks is in a disabled state from a UE, transmit, to the UE, an attach response indicating completion of attach to the first network, and establish a session for the first network of the UE through a session management apparatus (or session management entity) supporting mobility between the first network and the second network upon receiving a session establishment request for the first network from the UE after transmitting the attach response.

According to an embodiment, a user equipment (UE) in a wireless communication system is provided that includes a transceiver; and at least one controller configured to control the transceiver, and configured to transmit an attach request including first capability information including information related to a first network in an enabled state among at least two networks supported by the UE and information indicating that a second network among the at least two networks is in a disabled state to a mobility management apparatus, receive an attach response indicating completion of attach to the first network from the mobility management apparatus, and establish a session for the first network through a session management apparatus supporting mobility between the first network and the second network upon transmitting a session establishment request to the mobility management apparatus after receiving the attach response.

According to an embodiment, a method performed by a mobility management apparatus in a wireless communication system is provided, the method including receiving an attach request including first capability information including information related to a first network in an enabled state among at least two networks supported by the UE and information indicating that a second network among the at least two networks is in a disabled state from a UE; transmitting an attach response indicating completion of attach of the first network to the UE; and establishing a session for the first network of the UE through a session management apparatus supporting mobility between the first network and the second network upon receiving a session establishment request for the first network from the UE after transmitting the attach response.

According to an embodiment, a method performed by a mobility management apparatus in a wireless communication system is provided, the method including receiving, from a UE, an attach request including first capability information including information related to a first network in an enabled state among at least two networks in a disabled state; transmitting, to the UE, an attach response indicating completion of attach to the first RAT network; establishing a session for the first network of the UE through a session management apparatus supporting mobility between the first network and the second network upon receiving a session establishment request for the first network from the UE after transmitting the attach response.

According to an embodiment, a method performed by a UE in a wireless communication system is provided, the method including transmitting, to a mobility management apparatus, an attach request including first capability information including information related to a first network in an enabled state among at least two networks supported by the UE and information indicating that a second network among the at least two networks is in a disabled state to a mobility management apparatus; receiving, from the mobility management apparatus, an attach response indicating completion of attach to the first network; and establishing a session for the first network through a session management apparatus supporting mobility between the first network and the second network upon transmitting a session establishment request to the mobility management apparatus after receiving the attach response.

Accordingly, when interworking between multiple networks is applied in a wireless communication system that supports multiple RATs, the network in use can be switched seamlessly.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
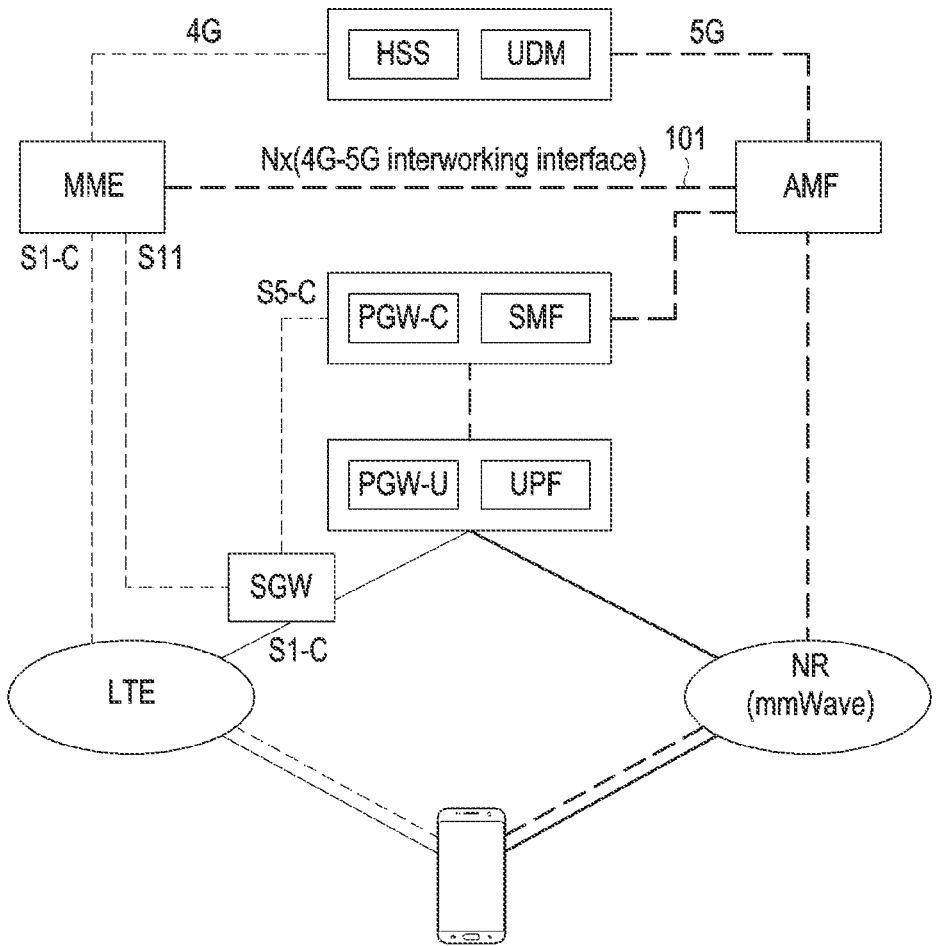
FIG. 1 illustrates an example of a wireless communication network structure supporting interworking between a 4G network and a 5G network, to which the present disclosure applies.

Hereinafter, the operation principle of the present disclosure will be described in detail with reference to the accompanying drawings. In the following description, a detailed description of known functions or configurations incorporated herein will be omitted when it is determined that the description may make the subject matter unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages, features and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose aspects of the embodiments of the present disclosure to inform those skilled in the art. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in certain embodiments may include one or more processors.

In the following description, a detailed description of known functions or configurations incorporated herein will be omitted when it is determined that the description may make the subject matter unclear. Hereinafter, embodiments will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names specified in the LTE and NR standards, which are the latest standards defined by the 3rd generation partnership project (3GPP) among existing communication standards, for the convenience of description. However, the disclosure is not limited by these terms and names, and may be applied in the same way to systems that conform other standards. In particular, the disclosure may be applied to 3GPP NR (5th generation mobile communication standard). In addition, embodiments may be applied to other communication systems having similar technical backgrounds or channel types. Further, based on determinations by those skilled in the art, the embodiments may be applied to other communication systems through some modifications without significantly departing from the scope of the present disclosure.

Such terms as "first" and "second" may be used to describe various elements, but the elements should not be limited by the terms. These terms are used only for the purpose of distinguishing one element from any other element.

The terms used in the disclosure are merely used to describe specific embodiments, and are not intended to limit the application range or use thereof. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Prior to the detailed description, examples of interpretable meanings for some terms used in the disclosure are provided. However, it should be noted that the interpretation examples presented below are not limited.

A base station (BS) is an entity that communicates with the UE, and may also be referred to as a BS, NodeB (NB), eNodeB (eNB), gNB, or an access point (AP).

A user equipment (User Equipment) is an entity that communicates with a BS, and may also be referred to as a UE, a mobile station (MS), a mobile equipment (ME), a device, or a terminal.

The network included in the embodiments may include a network device. A mobility management apparatus, a session management apparatus, a subscriber management apparatus, and the like may each be configured as separate apparatus, and may be configured to be included in a network device.

A method and an apparatus for establishing a session of a UE are provided so that communication is maintained without interruption even when a network is changed when a function change of the UE occurs in a wireless communication system composed of a plurality of networks (ex. 4G, 5G, 6G networks, etc.).

According to an embodiment, a function of a UE can be stopped or can be used after the function is recovered. Even when the network is changed, the UE may maintain a currently ongoing session without interruption and may change session information.

In an embodiment, an apparatus supporting a 4G network and a 5G network is disclosed, though embodiments are not limited thereto and may also be applied to next-generation networks such as a 6G network.

FIG. 1 illustrates an example of a wireless communication network structure supporting interworking between a 4G network and a 5G network, to which the present disclosure applies.

The interworking method illustrated in FIG. 1 provides a method in which a UE is attached to and communicates with only one network of 4G or 5G at any one time. The wireless communication network structure of FIG. 1 includes a mobility management entity (MME) that communicates S11 with a serving gateway (SGW) and communicates with the LTE network. The LTE network communicates S1-C interface with LTE and SGW. When the UE moves to the service area of the 4G or 5G network, the state information of the UE is transferred from a currently connected network to the network to be moved, thereby enabling a seamless service. This method requires a new interface 101 for interworking operation between 4G-5G networks. The 4G network or the 5G network may be referred to as a 4G radio access technology (RAT) communication system, or a 5G RAT communication system, respectively.

Figure 2:
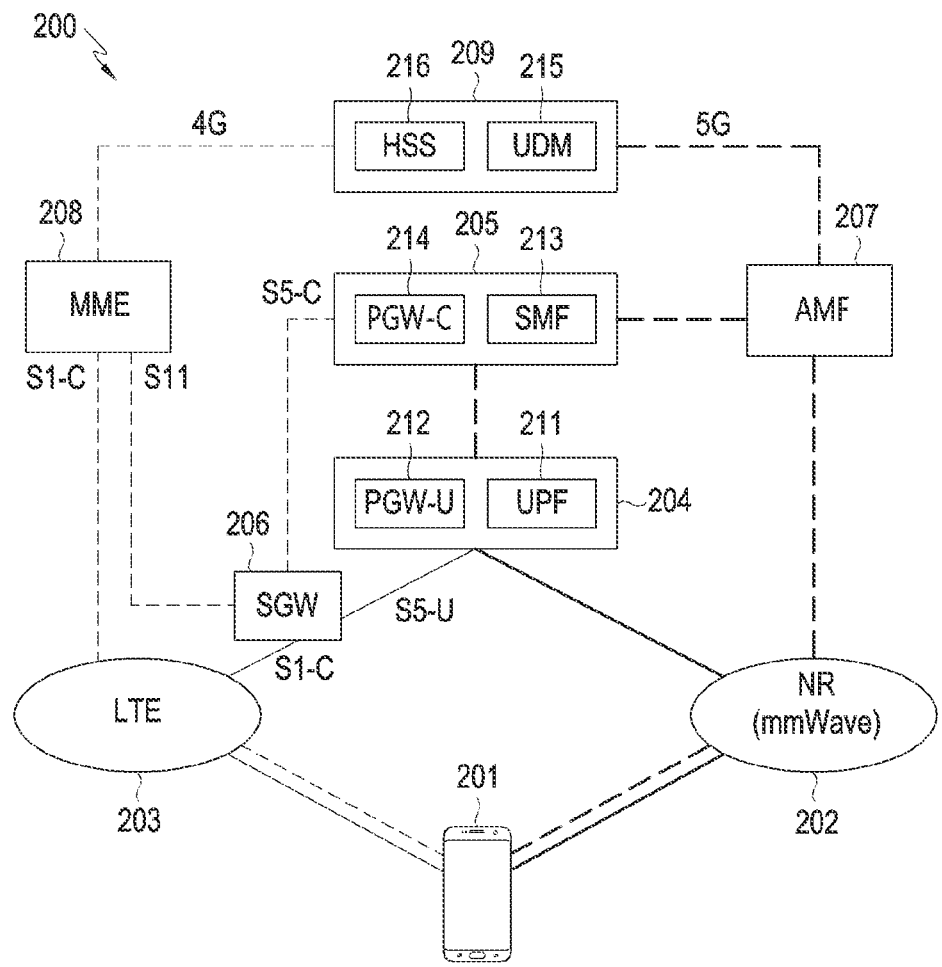
FIG. 2 illustrates an example of a wireless communication network structure supporting interworking between a 4G network and a 5G network, to which the present disclosure applies.

FIG. 2 illustrates an example of a wireless communication network structure supporting interworking between a 4G network and a 5G network, to which the present disclosure applies.

As illustrated in FIG. 2, the UE 201 separately attaches to a 4G network and to a 5G network, respectively, and may support a function of dual attach to 4G and 5G networks.

For example, the 4G network (or network device) may be composed of an MME 208, an SGW 206, an eNB (eNodeB) 203, and etc., and a PDN gateway (PGW)-control plane (PGW-C) 214, a PGW-user plane (PGW-U) 212, a home subscriber server (HSS) 216, and etc. may be configured with common functions not only in 4G networks but also in 5G networks.

For example, the 5G network may be composed of an access and mobility management function (AMF) 207, a new radio (NR) 202, and etc., and a session management function (SMF) 213, a user plane function (UPF) 211, a unified data management (UDM) 215, and etc. may be configured with collocated functions not only in 5G networks but also in 4G networks.

For example, PGW-C and SMF, PGW-U and UPF, and HSS and UDM may each be implemented as one collocated function, and may be commonly used for 4G and 5G network operation.

The MME 208 of the 4G network and the AMF 207 of the 5G network may be collectively referred to as a mobility management apparatus. The MME 208 and the AMF 207 may be utilized as mobility management apparatuses in both the 4G network system and the 5G network system, respectively. In addition, the PGW-C 214 of the 4G network, the SMF 213 of the 5G network, and the PGW-C+SMF integration function apparatus 205 may be collectively referred to as a session management apparatus. In addition, the PGW-U+UPF integration function apparatus 204 may be collectively referred to as a user plane function. The HSS+UDM integration function apparatus 209 may be collectively referred to as a data management function.

In the interworking method, when the UE moves to the service area of the 4G or 5G network while the UE is connected to both the 4G network and the 5G network, the data transfer path or session may be reconfigured. Accordingly, the UE may use a seamless communication service. Therefore, the session management method may not need to implement a new interface between 4G-5G networks.

When the interworking method is applied in the wireless communication system, the UE may separately perform an initial attach procedure with the 4G or 5G network. For example, the initial attach procedure may be performed individually or simultaneously for each network.

Figure 3:
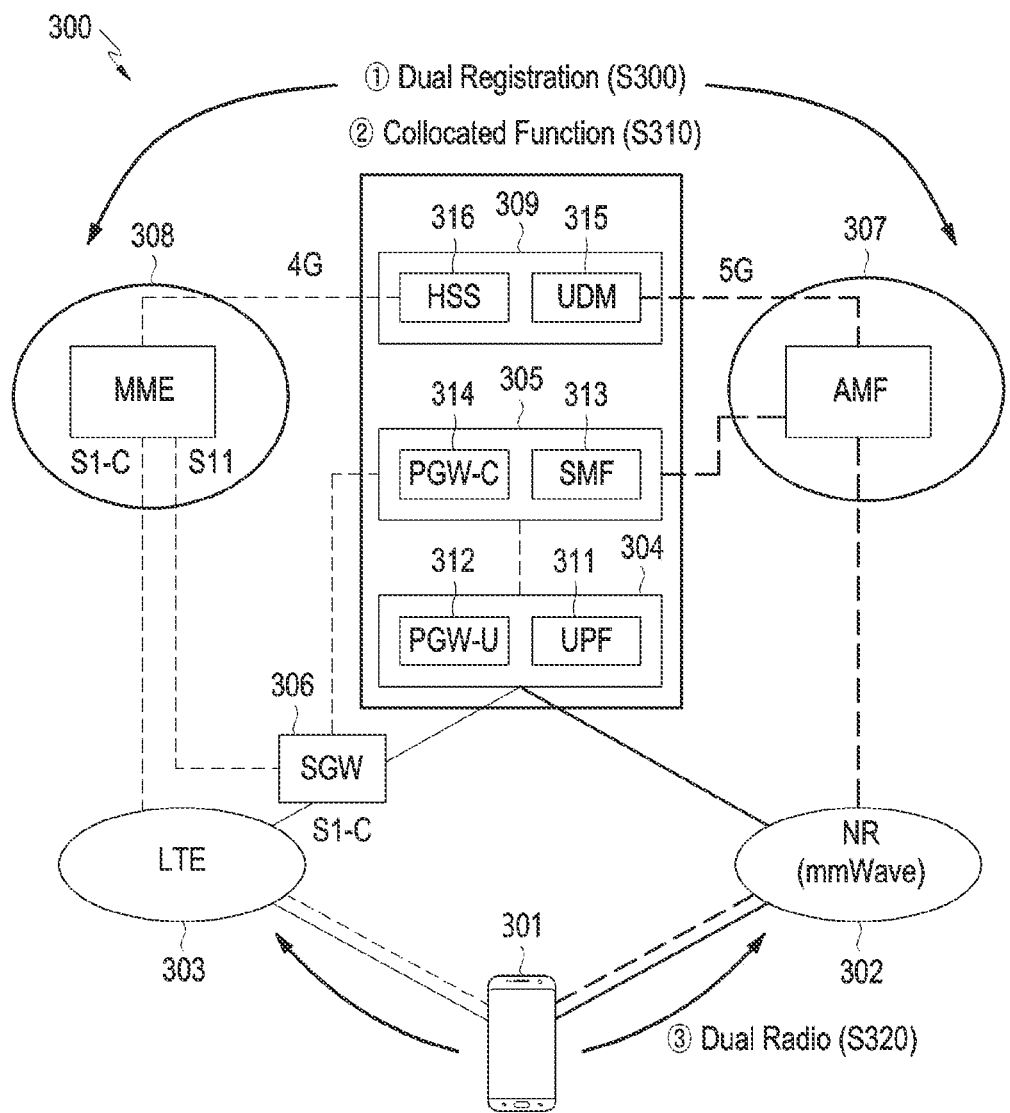
FIG. 3 illustrates an example of an interworking operation between a 4G network and a 5G network, to which the present disclosure applies.

FIG. 3 illustrates an example of an interworking operation between a 4G network and a 5G network, to which the present disclosure applies.

As illustrated in FIG. 3, the architecture of the wireless communication system may include a UE, a control plane, and a data plane.

In step S300, the UE 301 is capable of dual attach, i.e., dual registration, to the 4G network and the 5G network in an environment where the 4G network and the 5G network coexist. For example, when the UE moves to a service area between 4G and 5G networks in a state in which the UE is connected to both 4G and 5G networks, the data transfer path or session is reconfigured so that the UE can use a seamless communication service.

In the control plane, the UE 301 may be registered in both 4G networks and 5G networks, and UE contexts for 4G and 5G may be separated. The UE contexts may include information for connection to network.

The data plane may include an integrated 4G/5G function 304.

In FIG. 3, an NR system is illustrated as an example of a 5G system, and an LTE system is illustrated as an example of a 4G system. Examples of the integration function apparatus with reference to FIG. 3 include an integration function apparatus 309 of UDM 315 of 5G and HSS 316 of 4G, an integration function apparatus 305 of SMF 313 of 5G and PGW-C 314 of 4G, or an integration function apparatus 304 of UPF 311 of 5G and PGW-U 312 of 4G. The PGW-C 314 and SMF 313, PGW-U 312 and UPF 311, and HSS 316 and UDM 315 may each be implemented as one collocated function S310, and may be commonly used for 4G and 5G network operation.

The data plane may include a general IP anchor (SMF/PGW-C integration function apparatus 305 and UPF/PGW-U integration function apparatus 304), a UDM/HSS integration function apparatus 309 for storing IP anchor information, and an AMF 307 or MME 308 for retrieving IP anchor information from UDM/HSS 309 during handover (HO) registration.

When the interworking method is applied in the wireless communication system, the UE may separately perform an initial attach procedure with the 4G or 5G network. For example, the initial attach procedure may be performed individually or simultaneously for each network. For example, when the UE leaves the service coverage while initially attached to the 4G network and moves to the 5G network coverage, the UE may perform an initial attach to the 5G network (if not previously performed during the attach procedure) or a packet data network (PDN) connection request (PDN Connectivity Request) procedure (if previously performed during the attach procedure).

Figure 4:
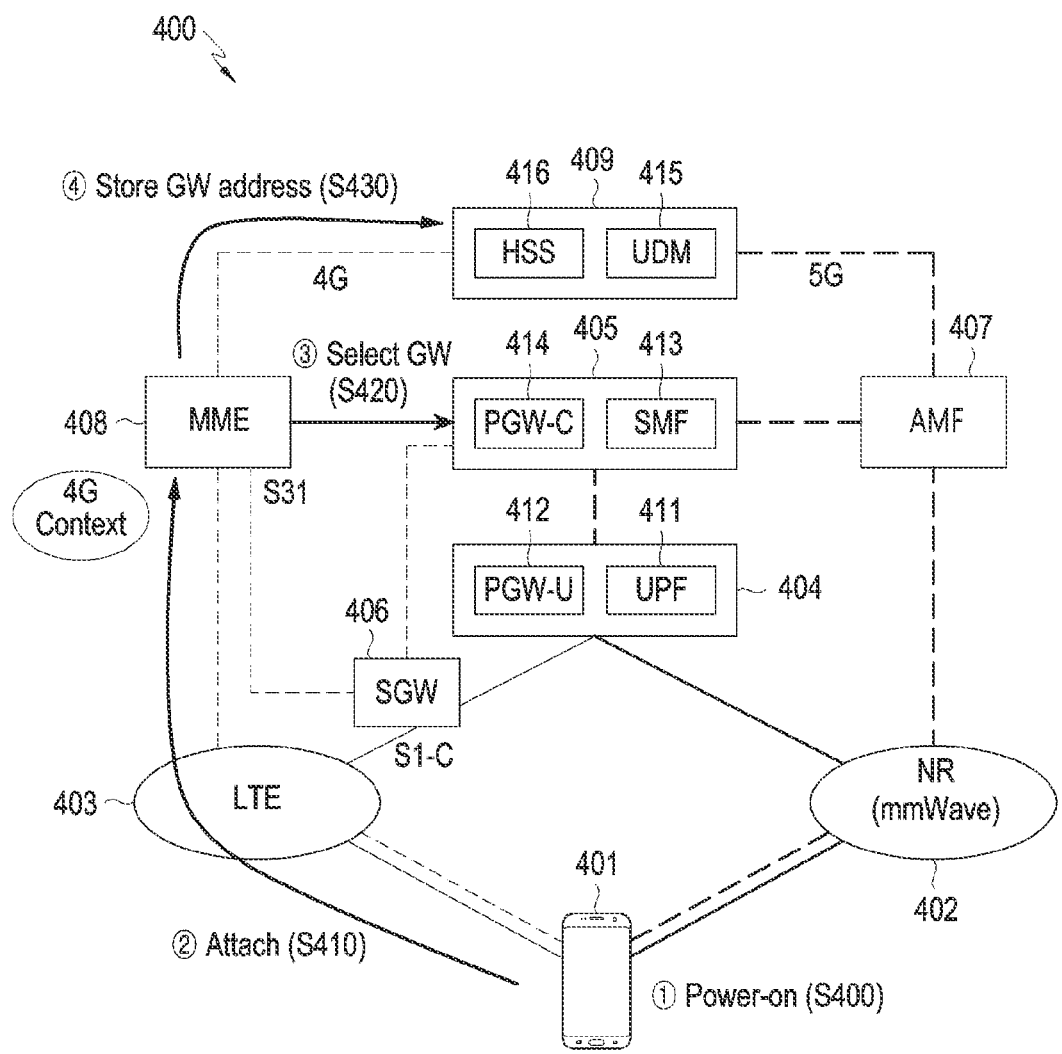
FIG. 4 illustrates an example of an operation in which a UE performs an initial attach procedure with a 4G network, to which the present disclosure applies.

FIG. 4 illustrates an example of an operation in which a UE performs an initial attach procedure with a 4G network, to which the present disclosure applies.

When the UE 401 is powered on in Step S400, the UE 401 may perform an initial attach with an evolved packet system (EPS).

In Step S410, the UE 401 may transmit information indicating 4G/5G non access stratum (NAS) support (4G/5G NAS Support) capability or dual registration support capability to the MME 408 through the attach request (Attach REQ) message. The capability may indicate that network is in an enabled state or in a disabled state.

In Step S420, when capability of 4G/5G NAS Support is received, the MME 408 may select an interworking gateway (GW) (e.g., SMF/PGW-C integration function apparatus 405) for the UE 401. In this case, a bearer configuration procedure for the default bearer of the UE 401 may be performed.

Figure 5:
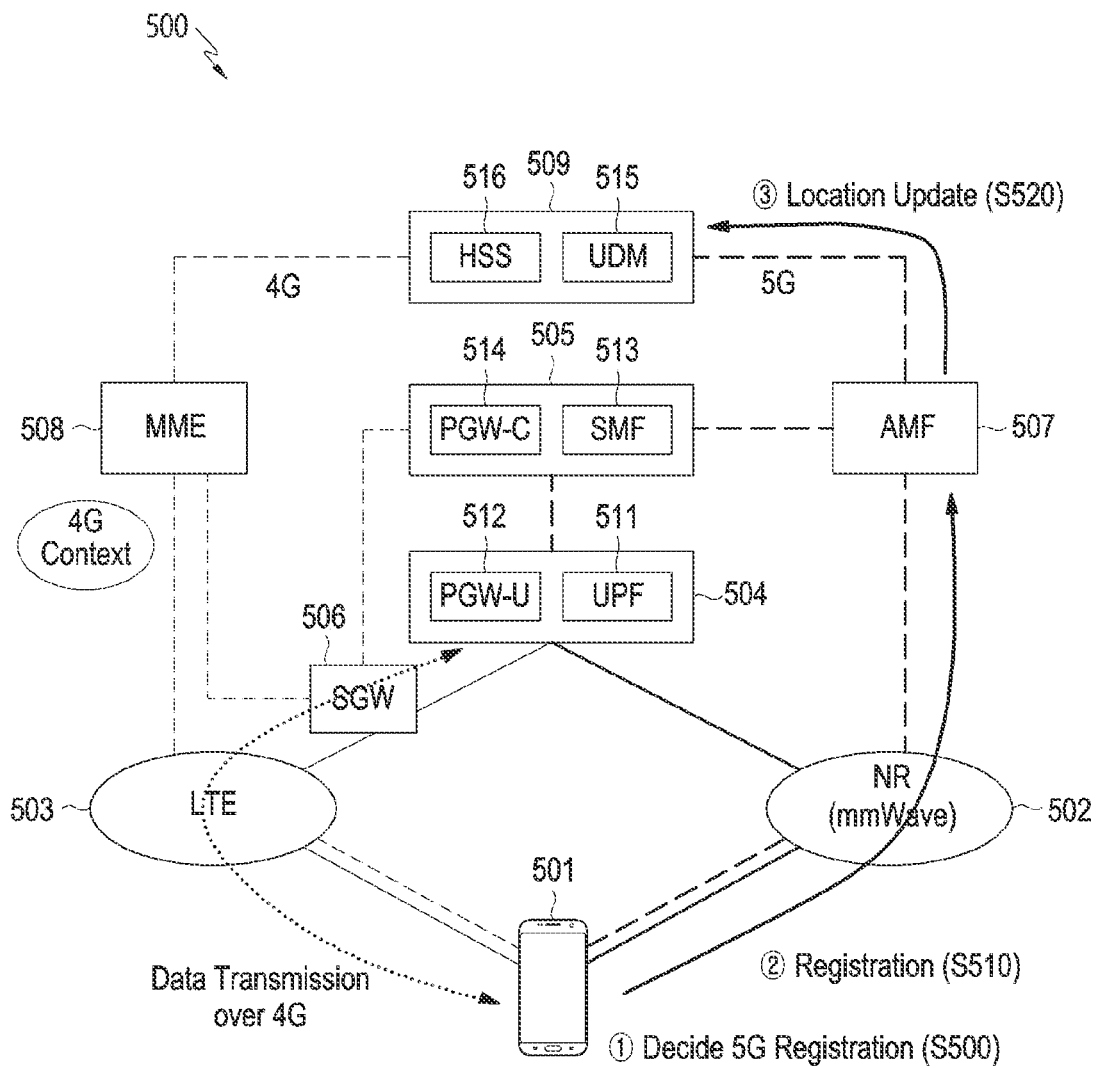
FIG. 5 illustrates an example of an operation in which a UE having performed the initial attach to a 4G network performs a handover to a 5G network, to which the present disclosure applies.

In Step S430, the MME 408 may perform a notification procedure to the HSS/UDM integration function apparatus 409 to store the address of the SMF 413/PGW-C 414 or related access point name (APN) information in the HSS 416/UDM 415 integration function apparatus 409As shown in FIG. 4, an integration function 404 is provided of UPF 411 and PGW-U 412, with a SGW 406 and that communicates with the LTE network 403. FIG. 5 illustrates an example of an operation in which a UE having performed the initial attach to a 4G network performs a handover to a 5G network.

In Step S500, the UE 501 may decide the timing to register with the 5G system 502. For example, the UE 501 may decide the timing to register with the 5G system using NR detection, neighbor discovery, and comparison of threshold values.

The UE 501 may include a 5G globally unique temporary identifier (GUTI) mapped from 4G (herein 5G GUTI mapped from 4G) together with information indicating the 4G/5G NAS Support capability or the Dual registration support capability in the registration request (Registration REQ) message, and transmit the registration request message to the AMF 507 in Step S510.

In Step S520, the AMF 507 may perform a location update operation with the UDM 515/HSS 516 integration function apparatus 509. The location update message transmitted from the AMF 507 to the UDM/HSS integration function apparatus 509 may include dual attach indication information. In this case, the AMF 507 may retrieve the address of the IP anchor (e.g., SMF 513) for the APN/data network name (DNN) from the UDM/HSS integration function apparatus 509. In this case, the UDM/HSS integration function apparatus 509 may not transmit a cancel location message to the MME 508 when 'dual attach indication' information is received.

Figure 6:
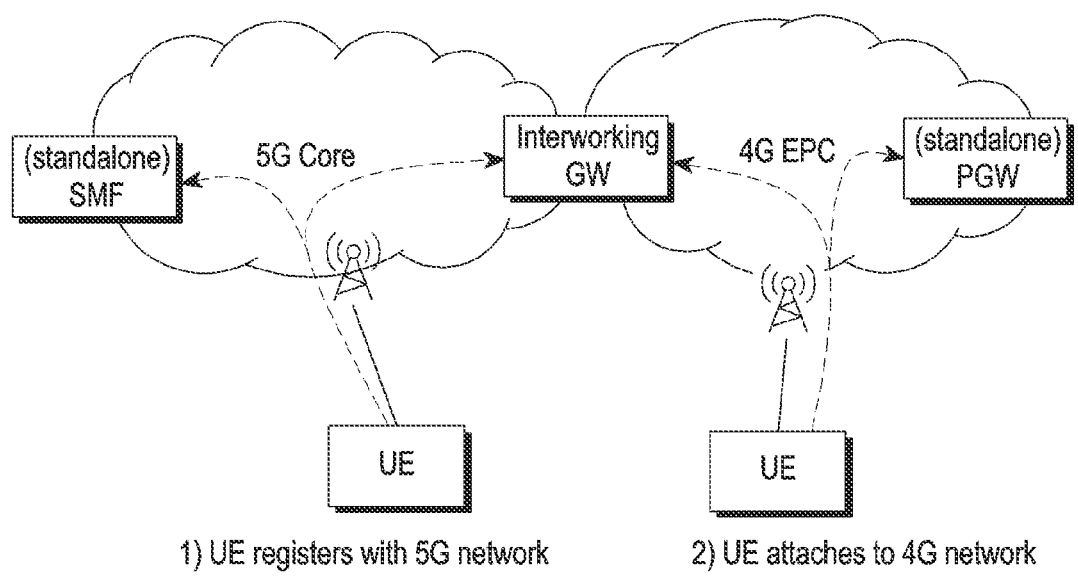
FIG. 6 is a diagram illustrating an example of a structure of a wireless communication system configured with a 4G network (or 4G radio access technology (RAT) network) and a 5G network (or 5G RAT network) according to an embodiment.

The AMF 507 may store the address of the inquired IP anchor (e.g., SMF 513 of the SMF/PGW-C integration function apparatus 505). As shown in FIG. 5, an integration function 504 is provided of UPF 511 and PGW-U 512, with SGW 506 that communicates with the LTE network 503. FIG. 6 is a diagram illustrating an example of a structure of a wireless communication system configured with a 4G network (or 4G RAT network) and a 5G network (or 5G RAT network) according to an embodiment. In addition, the procedure of allocating the initial attach of the UE and the session management function for the UE will be described. In this embodiment, the 4G network and the 5G network may be a 4G RAT network and a 5G RAT network.

In order to use a communication service, the UE may perform the initial attach procedure by selecting one of the 4G RAT network or the 5G RAT network according to selection criteria configured in the UE, such as network priority configured by an operator, UE function, and current signal strength. In this procedure, the UE transmits the UE's function information to the network, and the network checks the UE's function information and the UE's subscription information to determine whether there is an additionally usable network in addition to the network to which the UE is currently connected. When the function of the UE supports only the 4G RAT network (or 5G RAT network), the network allocates a session management function dedicated to the 4G network (or 5G network) to establish a session with the UE. If it is determined that there is an additionally usable network for the UE, when the network establishes a session with the UE in case the UE switches to the additionally usable network, the network may allocate an interworking GW (PGW-C+SMF) capable of supporting network switching between 4G and 5G networks instead of allocating a standalone PGW or standalone SMF dedicated to 4G or 5G for session management. That is, in response to a session establishment request from the UE, because the MME determines and uses an appropriate session management function (or session management apparatus) based on the UE's function information transmitted during the initial attach of the UE to the network, in the case that the UE's function is changed after initial attach due to operator's policy, user's selection, network congestion control, etc., there is a problem that communication needs to be re-established because the session management function (or session management apparatus) that has already been determined by referring to the UE function information delivered in the initial attach procedure and the newly changed UE function is inconsistent and thus session management cannot be supported.

Figure 7:
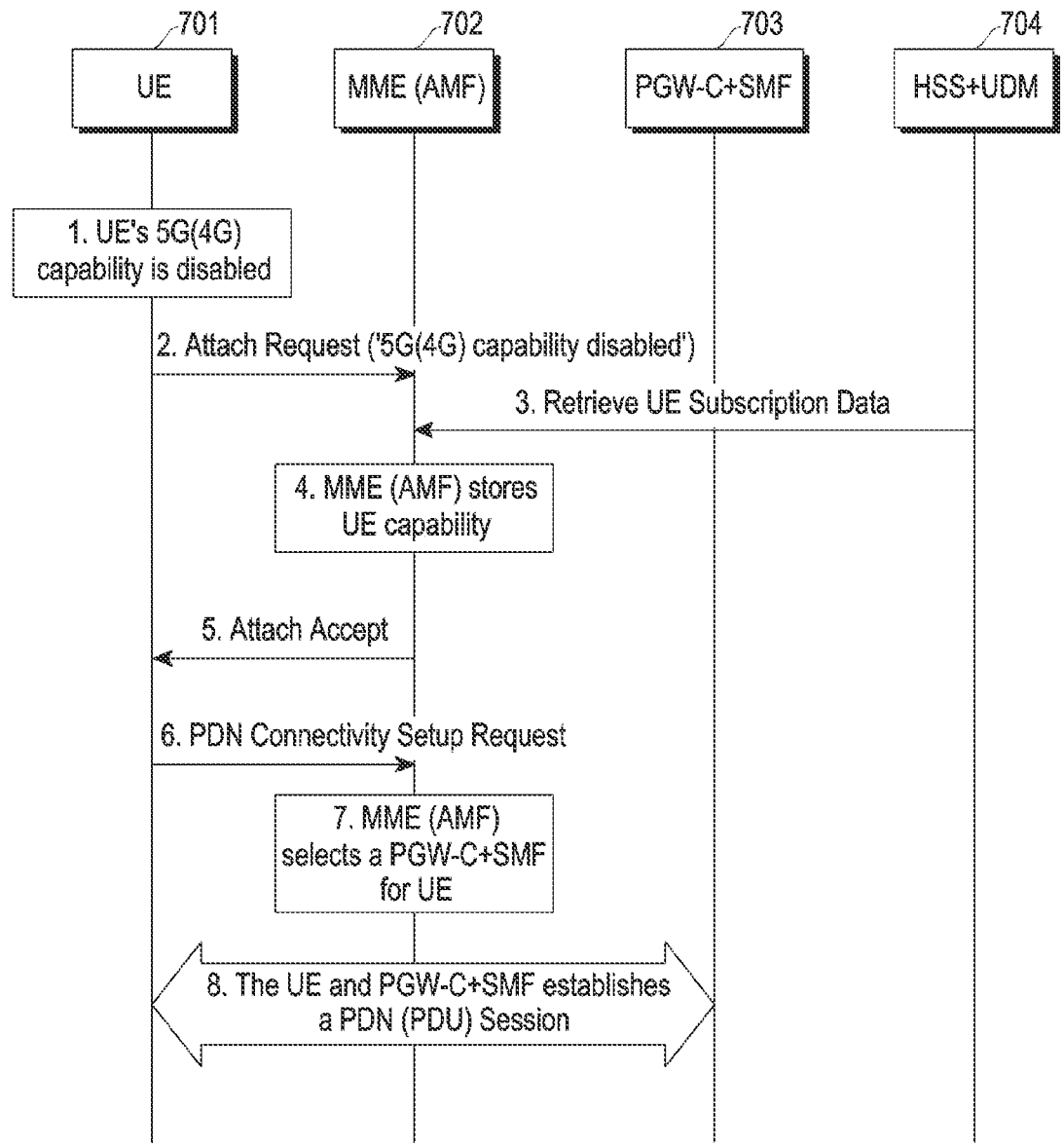
FIG. 7 is a diagram illustrating a procedure for a UE to attach a network in a wireless communication system according to an embodiment.

FIG. 7 is a diagram illustrating a procedure for a UE to attach a network (RAT network) in a wireless communication system according to an embodiment.

In step 1, the UE 701 has a communication function with at least two RAT networks, such as a 5G (or 4G) RAT network in addition to the 4G (or 5G) RAT network to be attached, but, because of various situations such as operator's control through a separate application, etc., user's network function configuration, or attach blocking due to congestion in the network, a communication function with at least one RAT network, such as a second RAT network (if the RAT network that the current UE 701 tries to attach is a 4G RAT network, the second RAT network is a 5G RAT network, and if the RAT network to which the UE 701 tries to attach is a 5G RAT network, the second RAT network is a 4G RAT network), may be in a disabled state at the time for network attach.

Embodiments will be described based on a UE having a communication function with a 4G network and a 5G network, but the embodiments are not limited thereto, and may be similarly applied to a UE having a function with a plurality of networks.

In step 2, the UE 701 may transmit a control message requesting an initial attach to the network, for example, an attach request message (in the 5G RAT network, the control message may be a control message requesting a registration request). The attach request message may include function (capability) information of the UE 701, and the function (capability) information of the UE 701 may be transmitted to the network including information designated as a disabled state for communication function information between the UE 701 and the second RAT network that is disabled at the corresponding time point. In addition, the function information of the UE 701 may be transmitted to the network by designating the communication function information with the first RAT network, which is an enabled state, as the enabled state. For example, the function information of the UE 701 may include information related to the first RAT network in the enabled state.

In step 3, the first RAT network, for example, the MME (AMF in the case of 5G RAT network) 702 of the 4G RAT network, may request subscription information of the UE 701 from the HSS+UDM 704, and may receive the subscription information of the UE 701 from the HSS+UDM 704 in response to the subscription information request.

In step 4, the MME (AMF) 702 may determine whether the UE 701 has a communication function with the second RAT network based on the subscription information of the UE 701 received from the HSS+UDM 704 and the function information of the UE 701 received from the UE 701, or based on the received function information of the UE 701. In addition, the MME (AMF) 702 may store the function information of the UE 701 in an internal storage. The stored function information of the UE 701 may then be used by a session management apparatus to select an appropriate session management function according to the communication function of the UE 701 in a session establishment procedure of the UE 701.

In step 5, the MME (AMF) 702 may transmit a control message for notifying that the initial attach requested by the UE 701 has been successfully completed, for example, an attach response message, e.g., an attach accept registration response message in a 5G RAT network.

The attach response message is a response message to the attach request message, and may include information for notifying that the attach to the first RAT network is completed. When the RAT network attached by the UE 701 is a 4G RAT network, a procedure for configuring a Default PDN session may be additionally performed in the initial attach procedure, and a procedure similar to that of steps 7 to 8 described below may be performed between MME 702 and PGW-C+SMF 703.

In step 6, the UE 701 may transmit a control message for requesting a new PDN Connectivity (PDU Session in the case of a 5G RAT network) setup to the MME (AMF) 702.

In step 7, the MME (AMF) (702) confirms from the UE 701's function information saved in step 4 that the UE 701 has a communication function with the second RAT network but the communication function with the current second RAT network is a disabled UE 701, and may not select a general 4G-only or 5G-only session management function (PGW-C for 4G, SMF for 5G) in case the UE 701's communication function with the second RAT network is restored, but may select a session management function (PGW-C+SMF) 703 that can support mobility between 4G-5G RAT networks.

In step 8, the UE 701, the MME (AMF) 702, and the PGW-C+SMF 703 may perform a standard procedure for establishing a session of the UE 701 through the currently connected RAT network.

Figure 8:
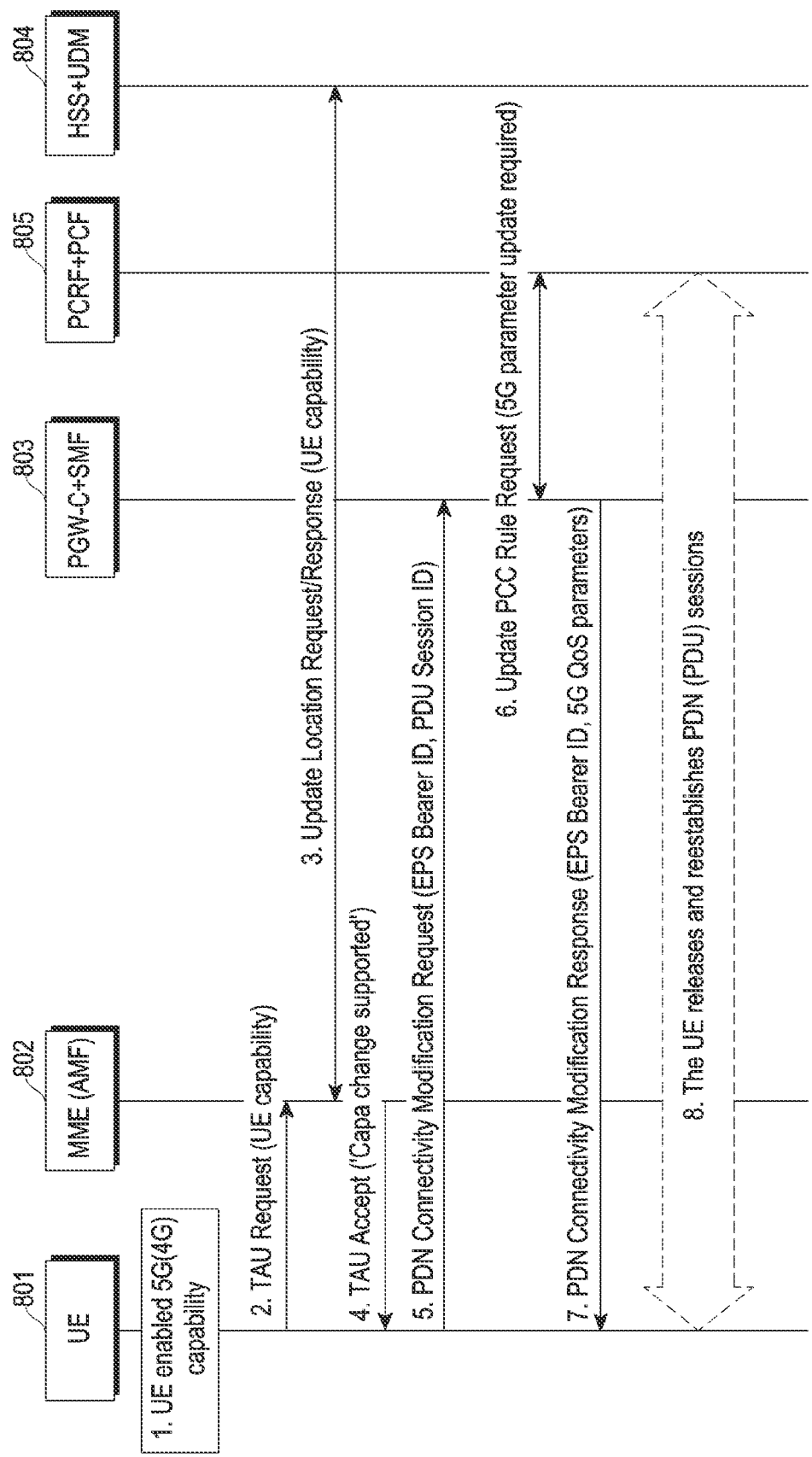
FIG. 8 is a diagram illustrating a procedure for updating session information of a UE when a function change of the UE occurs during communication in a wireless communication system according to an embodiment.

FIG. 8 is a diagram illustrating a procedure for updating (changing) session information of a UE when a function change of the UE occurs during communication in a wireless communication system according to an embodiment.

In step 1, the UE 801 may enable a communication function with at least one RAT network, such as the second RAT network (if the RAT network to which the UE 801 is connected at the time is a 4G RAT network, the second RAT network becomes a 5G RAT network, and if the RAT network to which the UE 801 is connected at that time is a 5G RAT network, the second RAT network may be a 4G RAT network) of the UE 801, which was in a disabled state because of user's network function configuring, operator's control through separate application, or expiration of waiting time until reuse of configured function when network function is blocked.

Embodiments will be described based on a UE having a communication function with a 4G network and a 5G network for convenience of description, but the embodiments are not limited thereto and may be similarly applied to a UE having a function with a plurality of networks.

In step 2, the UE 801 may transmit an update request message including updated (changed) function (capability) information of the UE 801 to the network. For example, the updated (changed) function information of the UE 801 may be included in a tracking area update (TAU) request message. In an embodiment, a case in which the updated (changed) function (capability) information of the UE 801 is transmitted through a TAU request message will be described as an example, but the updated (changed) function (capability) information of the UE 801 may be transmitted using any one message or a new message among other previously implemented messages as well as the TAU request message. The function information of the UE 801 may include information related to the first RAT network in the enabled state and the second RAT network. Through the updated function information of the UE 801, the MME (AMF) 802 may identify that the second RAT network is changed from a disabled state to an enabled state.

In step 3, the MME (AMF) 802 that has received the updated (changed) function (capability) information of the UE 801 from the UE 801 may include the corresponding information in the location update request message and transmit the location update request message to the HSS+UDM 804. The HSS+UDM 804 may store the received updated function information of the UE 801 and may transmit a location update response message that is a response message to the location update request message to the MME (AMF) 802. The procedure between the MME (AMF) 802 and the HSS+UDM 804 may be included in the location update procedure. The HSS+UDM 804 may include, if necessary, subscription information of the UE 801 and allowed network information in the response message.

In step 4, the MME (AMF) 802 transmits an update response message for the updated function report of the UE 801 to the UE 801. For example, the update response message may be a TAU accept message that is a response message to the TAU request message. The MME (AMF) 802 may include, in the update response message, information for notifying that the second RAT network can be used according to the function change of the UE 801 and that it is possible to support updating (changing) the session information in preparation for the movement of the UE 801 to the second RAT network. Information indicating that the update of session information is supportable may be implemented as an indicator, for example, a Capa change support indicator.

In step 5, by checking whether the update response message transmitted by the MME 802 includes information (Capa change supported) for notifying that updating the session information is supportable, the UE 801 may determine whether the current network is a network that supports the session information update (change) procedure when the session is updated (changed) according to the change in the UE 801's function. When the information for notifying that updating of the session information is supportable is included in a received update response message, the UE 801 may transmit a session change request message to the PGW-C+SMF 803 through the MME 802 in order to request transmission of session-related information to be used when moving to the second RAT network. The session change request message may include an EPS bearer identifier (ID) of the currently used session. The information related to the session to be used when moving to the second RAT network may include a Bearer ID, a quality of service (QoS) Flow ID, a QoS parameter, which are session parameters, and the like. As an embodiment, when the second RAT network is the 5G RAT network, the UE 801 may generate a corresponding 5G PDU Session ID for each session currently in use, and transmit the default bearer identifier (Default Bearer ID) representing each session currently in use and the protocol data unit (PDU) Session ID mapping information in the session change request message. For example, the session change request message may be a PDN Connectivity Modification Request message.

In step 6, the PGW-C+SMF 803 that has received the session change request message from the UE 801, for example, the PDN Connectivity Modification Request message, may perform a procedure for receiving policy information from the PCRF+PCF 805 to determine a new QoS policy to be applied to the second RAT network, if necessary.

In step 7, the PGW-C+SMF 803 may determine parameters to be used when moving to the second RAT network for each bearer belonging to each session currently being used by the UE 801, and transmit information related to the second RAT network including the bearer ID or QoS parameters to the UE 801 through the MME (AMF) 802. When the second RAT network is the 5G RAT network, the PGW-C+SMF 803 may determine 5G parameters to be used when moving to the 5G RAT network, and include 5G parameter information including 5G QoS parameters in a session change response message together with a corresponding bearer ID to the UE 801. For example, the session change response message may be a PDN Connectivity Modification Response message. The session change response message may be transmitted to the UE 801 through the MME (AMF) 802. The UE 801 may store information related to the second RAT network received through the MME (AMF) 802. The stored information related to the second RAT network may be activated and used when the UE 801 moves to the second RAT network.

Step 8 may be performed in the case when information indicating that session update support is possible (Capa change supported) is not included in the response message transmitted by the MME (AMF) 802 in step 4, i.e., when the current network does not support the session change procedure, even if the UE 801 requests a session change according to the UE 801 function change. In addition, step 8 may be performed when the session information update procedure from steps 5 to 7 fails, even if the network supports the session change procedure. In the above cases, after the UE 801 terminates both the current network and the established session by itself, the UE may request the configuration of information including parameters to be used when moving to the second RAT network by performing a session establishment procedure again for a session to be established based on the changed UE 801 function.

Figure 9:
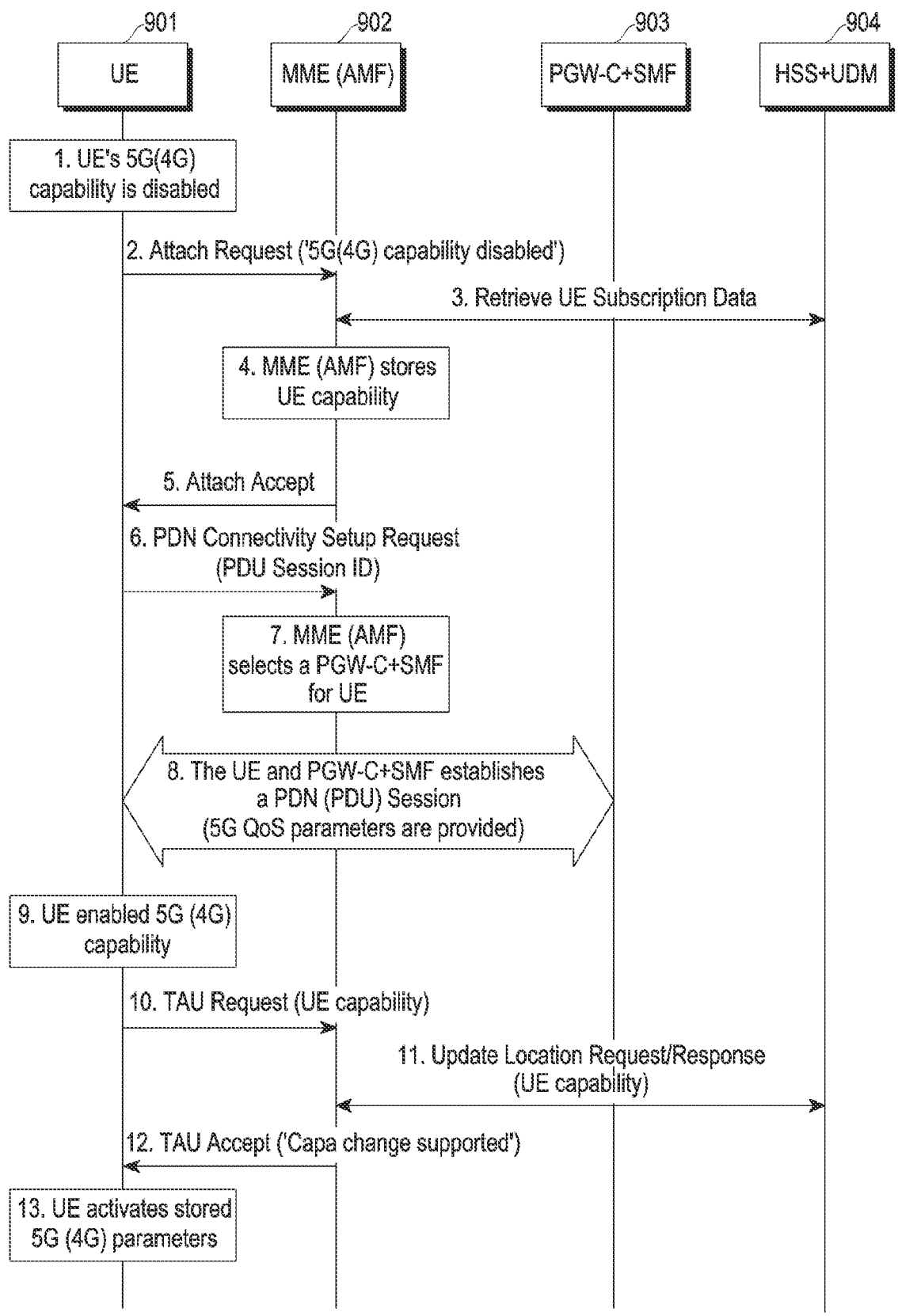
FIG. 9 is a diagram illustrating a procedure for updating or changing session information of a UE when the UE attaches a network and a function change of the UE occurs during communication in a wireless communication system according to an embodiment.

FIG. 9 is a diagram illustrating a procedure for updating or changing session information of a UE when the UE attaches a network and a function change of the UE occurs during communication after initial attach in a wireless communication system according to an embodiment.

In step 1, the UE 901 has a communication function with at least two RAT networks, such as a 5G (or 4G) RAT network in addition to the 4G (or 5G) RAT network to be attached, but, because of various situations such as operator's control through a separate application, etc., user's network function setting, or attach blocking due to congestion in the network, a communication function with at least one RAT network, such as a second RAT network (if the RAT network that the current UE 901 tries to attach is a 4G RAT network, the second RAT network is a 5G RAT network, and if the RAT network that the UE 901 tries to attach is a 5G RAT network, the second RAT network is a 4G RAT network), may be in a disabled state at the time of network attach.

Embodiments will be described based on a UE having a communication function with a 4G RAT network and a 5G RAT network for convenience of description, but the embodiments are not limited thereto, and may be similarly applied to a UE having a function with three or more plurality of networks.

In step 2, the UE 901 may transmit a control message requesting an initial attach to the network, for example, an attach request message (in the 5G RAT network, the control message may be a control message requesting a registration request). The attach request message may include function (capability) information of the UE 901, and the function (capability) information of the UE 901 may be transmitted to the network, including information designated as a disabled state for communication function information between the UE 901 and the second RAT network that is disabled at the corresponding time point. In addition, the function information of the UE 901 may be transmitted to the network by designating the communication function information with the first RAT network, which is an enabled state, as the enabled state. For example, the function information of the UE 901 may include information related to the first RAT network in the enabled state. The function (capability) information may indicate that network is in an enabled state or in a disabled state. The function (capability) information may indicate that UE supports 4G/5G network.

In step 3, the first RAT network, for example, the MME (AMF in the case of 5G RAT network) 902 of the 4G RAT network may request the subscription information of the UE 901 from the HSS+UDM 904, and may receive subscription information of the UE 901 from the HSS+UDM 904 in response to the subscription information request.

In step 4, the MME (AMF) 902 may determine whether the UE 901 has a communication function with the second RAT network based on the subscription information of the UE 901 received from the HSS+UDM 904 and the function information of the UE 901 received from the UE 901, or based on the received function information of the UE 901. In addition, the MME (AMF) 902 may store the function information of the UE 901 in an internal storage. The stored function information of the UE 901 may then be used by a session management apparatus to select an appropriate session management function according to the communication function of the UE 901 in a session establishment procedure of the UE 901.

In step 5, the MME (AMF) 902 may transmit a control message for notifying that the initial attach requested by the UE 901 has been successfully completed, for example, an attach response message, e.g., an attach accept registration response message in a 5G RAT network.

The attach response message is a response message to the attach request message, and may include information for notifying that the attach to the first RAT network is completed. When the RAT network attached by the UE 901 is a 4G RAT network, a procedure for configuring a Default PDN session may be additionally performed in the initial attach process, and a procedure similar to that of steps 7 to 8 described below may be performed between MME (AMF) 902 and PGW-C+SMF 903.

In step 6, the UE 901 may transmit a control message for requesting a new PDN Connectivity (PDU Session in the case of a 5G RAT network) setup to the MME (AMF) 902.

In an embodiment, in preparation for the UE 901 to move to the second RAT network in the future, the UE 901 may transmit parameter information related to the current session to be transmitted to the network when moving to the second RAT network to the network by including the information in the PDN Connectivity (for 5G RAT network, PDU Session) configuration message in advance. The parameter information may include an EPS bearer ID, a PDU session ID, and the like. When the second RAT network is a 5G RAT network, the UE 901 may transmit a 5G PDU Session ID to be used for the 5G session corresponding to the current session requesting the configuration in the request message.

In step 7, the MME (AMF) (902) confirms from the UE 901's function information saved in step 4 that the UE 901 has a communication function with the second RAT network, but the communication function with the current second RAT network is a disabled UE 901, and may not select a general 4G-only or 5G-only session management function (PGW-C for 4G, SMF for 5G) in case the UE 901's communication function with the second RAT network is restored, but may select a session management function (PGW-C+SMF) 903 that can support mobility between 4G-5G RAT networks. When a session management function (session management apparatus) capable of supporting mobility between 4G-5G RAT networks is selected, the MME (AMF) 902 may transmit information indicating that the UE 901 has a communication function with the second RAT network, but the communication function with the second RAT network is currently disabled to the selected session management function (e.g., PGW-C+SMF) 903.

In step 8, the UE 901, the MME (AMF) 902, and the PGW-C+SMF 903 may perform a standard procedure for establishing a session of the UE 901 through the currently connected RAT network. When the PGW-C+SMF 903 receives information from the MME (AMF) 902 indicating that the UE 901 has a communication function with the second RAT network, but the communication function with the second RAT network is currently disabled, the PGW-C+SMF 903 may configure session-related information to be used when moving to the second RAT network corresponding to the current session, and transmit the configured session-related information to the UE 901 through the MME 902 in preparation for moving the UE 901 to the second RAT network when the communication function with the second RAT network becomes available. The session-related information to be used when moving to the second RAT network may include session parameters such as Bearer ID, QoS Flow ID, QoS parameters, and the like. The UE 901 may store information related to a session to be used when moving to the second RAT network upon receiving from the MME 902.

In step 9, the UE 901 may, during communication after completing the initial attach, enable a communication function with at least one RAT network, such as the second RAT network (if the RAT network to which the UE 901 is connected at the time is a 4G RAT network, the second RAT network becomes a 5G RAT network, and if the RAT network to which the UE 901 is connected at that time is a 5G RAT network, the second RAT network may be a 4G RAT network) of the UE 901, which was in a disabled state because of user's network function setting, operator's control through separate application, or expiration of waiting time until reuse of set function when network function is blocked.

In step 10, the UE 901 may transmit an update request message including updated (changed) function (capability) information of the UE 901 to the network. For example, the function information of the UE 901 may be included in a TAU request message. In an embodiment, a case in which the updated (changed) function (capability) information of the UE 901 is transmitted through a TAU request message will be described as an example, but the updated (changed) function (capability) information of the UE 901 may be transmitted using any one message or a new message among other previously implemented messages as well as the TAU request message. The function information of the UE 901 may include information related to the first RAT network and the second RAT network in the enabled state. Through the update request message, the UE 901 may request transmission of session-related information to be used when moving to the second RAT network from the network. The information related to the session to be used when moving to the second RAT network may include a Bearer ID, a QoS Flow ID, a QoS parameter, which are session parameters, and the like. As an embodiment, when the second RAT network is a 5G RAT network, the UE 901 may generate a corresponding 5G PDU Session ID for each session currently in use, and transmit the default bearer identifier (Default Bearer ID) representing each session currently in use and the protocol data unit (PDU) Session ID mapping information in the session change request message. Through the updated function information of the UE 901, the MME (AMF) 902 may identify that the second RAT network is changed from a disabled state to an enabled state.

In step 11, the MME (AMF) 902 that has received the updated (changed) function (capability) information of the UE 901 from the UE 901 may include the corresponding information in the location update request message and deliver the location update request message to the HSS+UDM 904. The HSS+UDM 904 may store the received updated function information of the UE 901 and may transmit a location update response message that is a response message to the location update request message to the MME (AMF) 902. The procedure between the MME (AMF) 902 and the HSS+UDM 904 may be included in the location update procedure. The HSS+UDM 904 may include, if necessary, subscription information of the UE 901 and allowed network information in the response message.

In step 12, the MME (AMF) 902 transmits an update response message for the updated function report of the UE 901 to the UE 901. For example, the update response message may be a TAU accept message that is a response message to the TAU request message. The MME (AMF) 902 may include, in the update response message, information for notifying that the second RAT network can be used according to the function change of the UE 901 and that it is possible to support updating (changing) the session information in preparation for the movement of the UE 901 to the second RAT network. The information indicating that the update of session information is supportable may be implemented as an indicator, for example, a Capa change support indicator. The update response message to the function report of the updated (changed) UE 901 may include information related to a session to be used when moving to the second RAT network. The session-related information to be used when moving to the second RAT network may include session parameters such as Bearer ID, QoS Flow ID, QoS parameters, and the like. The session-related information to be used when moving to the second RAT network may be received from the session management function (PGW-C+SMF) 903 to the UE 901 through the MME 902. When the UE 901 receives information related to a session to be used when moving to the second RAT network, the UE 901 may store the received information.

In step 13, when it is confirmed in step 12 that the update response message received from the MME (AMF) 902 includes information (Capa change supported) indicating that the session information change can be supported according to the function change of the UE 901, the UE 901 may perform a procedure of activating session-related information to be used when moving to the second RAT network, which is received and stored from PGW-C+SMF MME (AMF) 903 through MME (AMF) 902 in step 8 or step 12 as a session parameter to be used when moving to the second RAT network.

In an embodiment, in a method of a mobility management apparatus in a wireless communication system, the method provides including receiving an attach request including first capability information including information related to a first RAT network in an enabled state among at least two RAT networks supported by the UE and information indicating that a second RAT network among the at least two RAT networks is in a disabled state from a UE, transmitting an attach response indicating that the attach to the first RAT network has been completed to the UE, and after completing the attach process, updating the UE state through the first RAT network by the UE as the communication function state for the second RAT network from the UE is changed to an enabled state, and updating the session of the UE to support mobility between the first RAT network and the second RAT network after receiving the status update from the UE.

Figure 10:
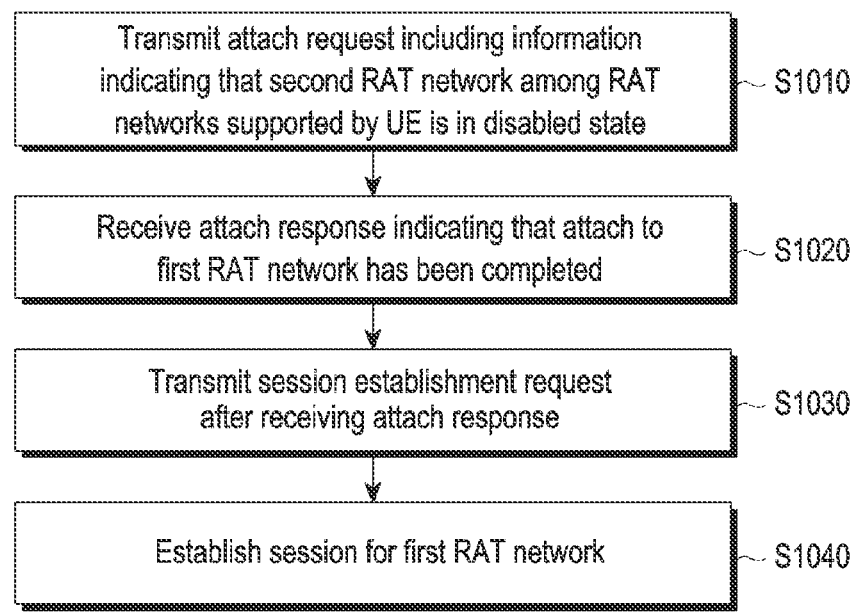
FIG. 10 is a flowchart illustrating an operation in which a UE attaches a network and establishes a session according to an embodiment.

FIG. 10 is a flowchart illustrating an operation in which a UE attaches a network and establishes a session according to an embodiment that may include operations of the UE devices in the embodiments of FIGS. 6 to 9.

In step S1010, the UE may transmit an attach request including information related to a first RAT network (or first network) in an enabled state among at least two RAT networks (or network) supported by the UE and first capability information including information indicating that a second RAT network (or second network) among the at least two RAT networks is in a disabled state to the mobility management device. The information indicating that the disabled state may include a 5G (4G) capability disabled indicator.

The UE may receive an attach response indicating that the attach to the first RAT network (or the first network) is completed from the mobility management apparatus in step S1020.

After receiving the attach response, the UE may transmit a session establishment request for session establishment to the mobility management apparatus in step S1030. In preparation for the UE to move to the second RAT network (or the second network) later, the UE may transmit the parameter information, related to the current session to be transmitted to the network when moving to the second RAT network (or the second network), to the network by including the parameter information in the session establishment request message in advance.

The UE may establish a session for the first RAT network (or the first network) through a session management device supporting mobility between the first RAT network (or the first network) and the second RAT network (or the second network) in step S1040.

Figure 11:
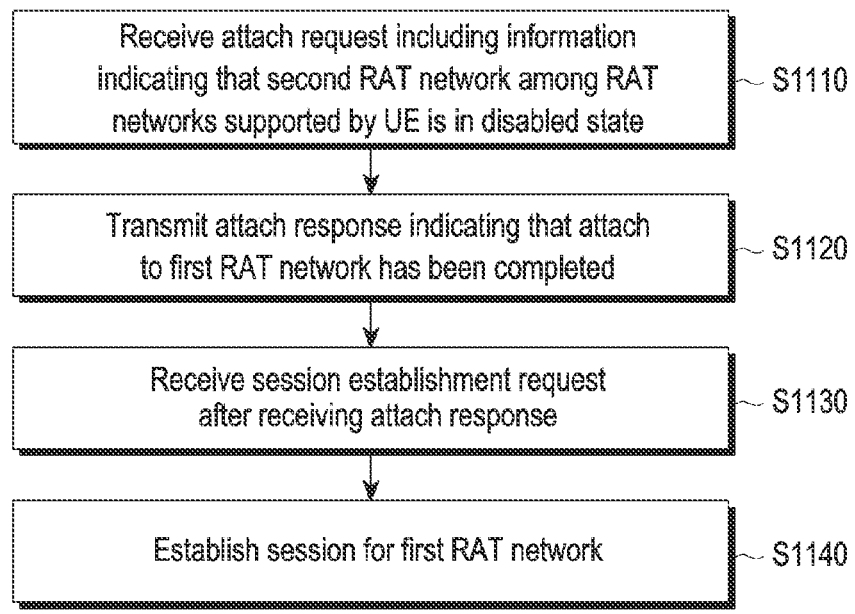
FIG. 11 is a flowchart illustrating an operation in which a mobility management apparatus supports communication of a UE and manages a session according to an embodiment.

FIG. 11 is a flowchart illustrating an operation in which a mobility management apparatus supports communication of a UE and manages a session according to an embodiment that may include operations of the mobility management apparatuses in the embodiments of FIGS. 6 to 9.

The mobility management apparatus is a device for managing mobility between networks, and may be, for example, an MME of a 4G RAT network or an AMF of a 5G RAT network, and may be an entire network device including the MME and the AMF.

The mobility management apparatus may receive an attach request including information related to a first RAT network (or first network) in an enabled state among at least two RAT networks (or network) supported by the UE and first capability information including information indicating that a second RAT network (or second network) among the at least two RAT networks is in a disabled state from the UE in step S1110. The information indicating that the disabled state may include a 5G (or 4G) capability disabled indicator. The mobility management apparatus may store information indicating that the second RAT network (or the second network) is in a disabled state.

The mobility management apparatus may transmit an attach response notifying that the attach to the first RAT network (or the first network) is completed to the UE in step S1120.

After transmitting the attach response, the mobility management apparatus may receive a session establishment request for the first RAT network (or first network) from the UE S1130.

The mobility management apparatus may select a session management function capable of supporting mobility between the first RAT network (or first network) and the second RAT network (or second network) in order to establish a session of the UE based on information indicating that the stored second RAT network (or second network) is in a disabled state.

The mobility management apparatus may establish a session for the first RAT network (or the first network) through a session management device supporting mobility between the first RAT network (or the first network) and the second RAT network (or the second network) in step S1140.

Figure 12:
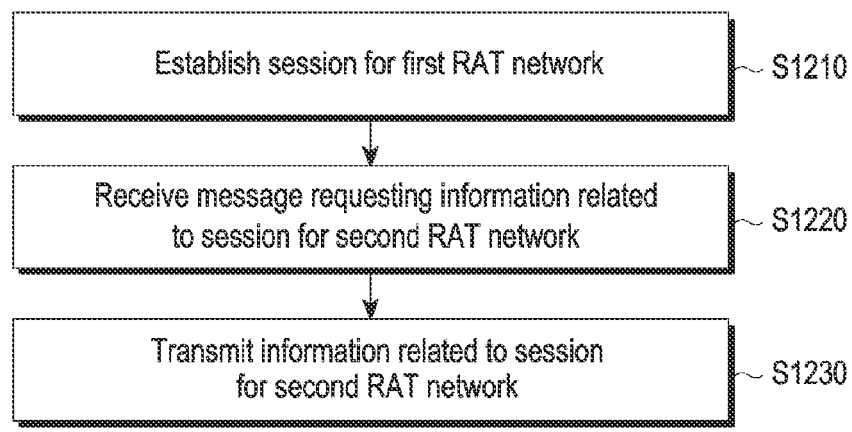
FIG. 12 is a flowchart illustrating an operation in which a session management apparatus establishes a session according to an embodiment.

FIG. 12 is a flowchart illustrating an operation in which a session management apparatus establishes a session according to an embodiment that may include session management apparatus (function) operations of the devices in the embodiments of FIGS. 6 to 9.

The session management apparatus is a device for establishing and managing a session with a UE, and may be, for example, a PGW-C of a 4G RAT network or an SMF of a 5G RAT network, or an integrated PGW-C+SMF device.

The session management apparatus may establish a session for the first RAT network (or first network) of the UE in step S1210. The session management apparatus may receive information indicating that the communication function with the current second RAT network is disabled from the mobility management device.

The session management apparatus may receive a message requesting information related to a session for the second RAT network (or the second network) from the UE through the MME in step S1220. The session management apparatus may perform a procedure for receiving policy information from PCRF+PCF to determine a new QoS policy to be applied to the second RAT network. The message requesting session related information for the second RAT network may include an EPS bearer ID of the session currently being used in the session change request message. The message requesting information related to the session for the second RAT network may be transmitted through the session for the established first RAT network.

The session management apparatus may transmit information related to the session for the second RAT network (or the second network) to the UE through the MME in step S1230.

The information related to the session for the second RAT network may include a Bearer ID, a QoS Flow ID, a QoS parameter, etc., which are session parameters. When the second RAT network is a 5G network, the UE may generate a corresponding 5G PDU Session ID for each session currently in use, and transmit the default bearer identifier (Default Bearer ID) representing each session currently in use and the protocol data unit (PDU) Session ID mapping information in the session change request message.

Figure 13:
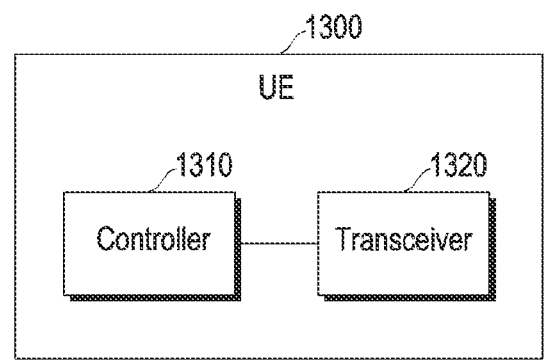
FIG. 13 illustrates an example of a structure of a UE according to an embodiment.

FIG. 13 illustrates an example of a structure of a UE according to embodiments. As illustrated in FIG. 13, the UE may include at least one controller (or processor) 1310 and a transceiver 1320 including a receiver and a transmitter. The UE may also include a memory. The transceiver 1320 and the memory may be connected to the at least one controller 1310 to operate under the control of the at least one controller 1310.

At least one controller 1310 may control a series of processes so that the operation of the UE described in the embodiments may be performed. The transceiver 1320 may transmit and receive signals to and from network devices 1400 and 1500 (see, FIGS. 14 and 15). The signal may include control information and data.

Figure 14:
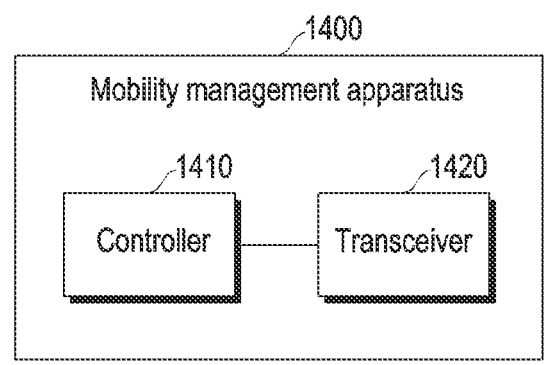
FIG. 14 illustrates an example of a structure of a mobility management apparatus (or mobility management function) according to an embodiment.

FIG. 14 illustrates an example of a structure of a mobility management apparatus (or mobility management entity (MME), AMF) 1400 according to an embodiment. As illustrated in FIG. 14, the mobility management apparatus 1400 may include at least one controller (processor) 1410 and a transceiver 1420 including a receiver and a transmitter. The mobility management apparatus may include a memory. The transceiver 1420 and the memory may be connected to the at least one controller 1410 to operate under the control of the at least one controller 1410.

At least one controller 1410 may control a series of processes so that the operation of the mobility management apparatus described in the embodiments may be performed. The transceiver 1420 may transmit and receive signals to and from the UE 1300 and other network devices 1500. The signal may include control message and data information.

Figure 15:
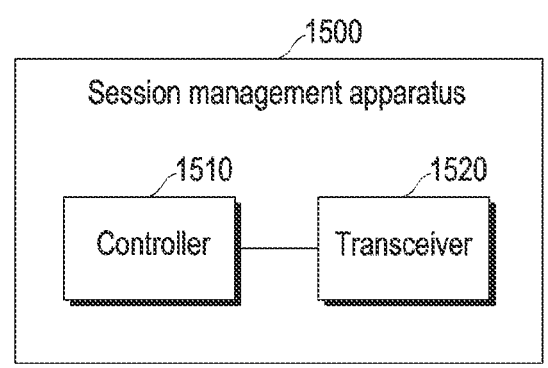
FIG. 15 illustrates an example of a structure of a session management apparatus (or a session management function) according to an embodiment.

FIG. 15 illustrates an example of a structure of a session management apparatus (or a session management function, session management entity) 1500 according to an embodiment. As illustrated in FIG. 15, the session management apparatus 1500 may include at least one controller (processor) 1510 and a transceiver 1520 including a receiver and a transmitter. The mobility management apparatus may include a memory. The transceiver 1520 and the memory may be connected to the at least one controller 1510 to operate under the control of the at least one controller 1510. In an embodiment, the session management apparatus may refer to SMF+PGW-C.

At least one controller 1510 may control a series of processes so that the operation of the mobility management apparatus described in the embodiments may be performed. The transceiver 1520 may transmit and receive signals to and from the UE 1300 and other network devices 1400. The signal may include control message and data information.

Figure 16:
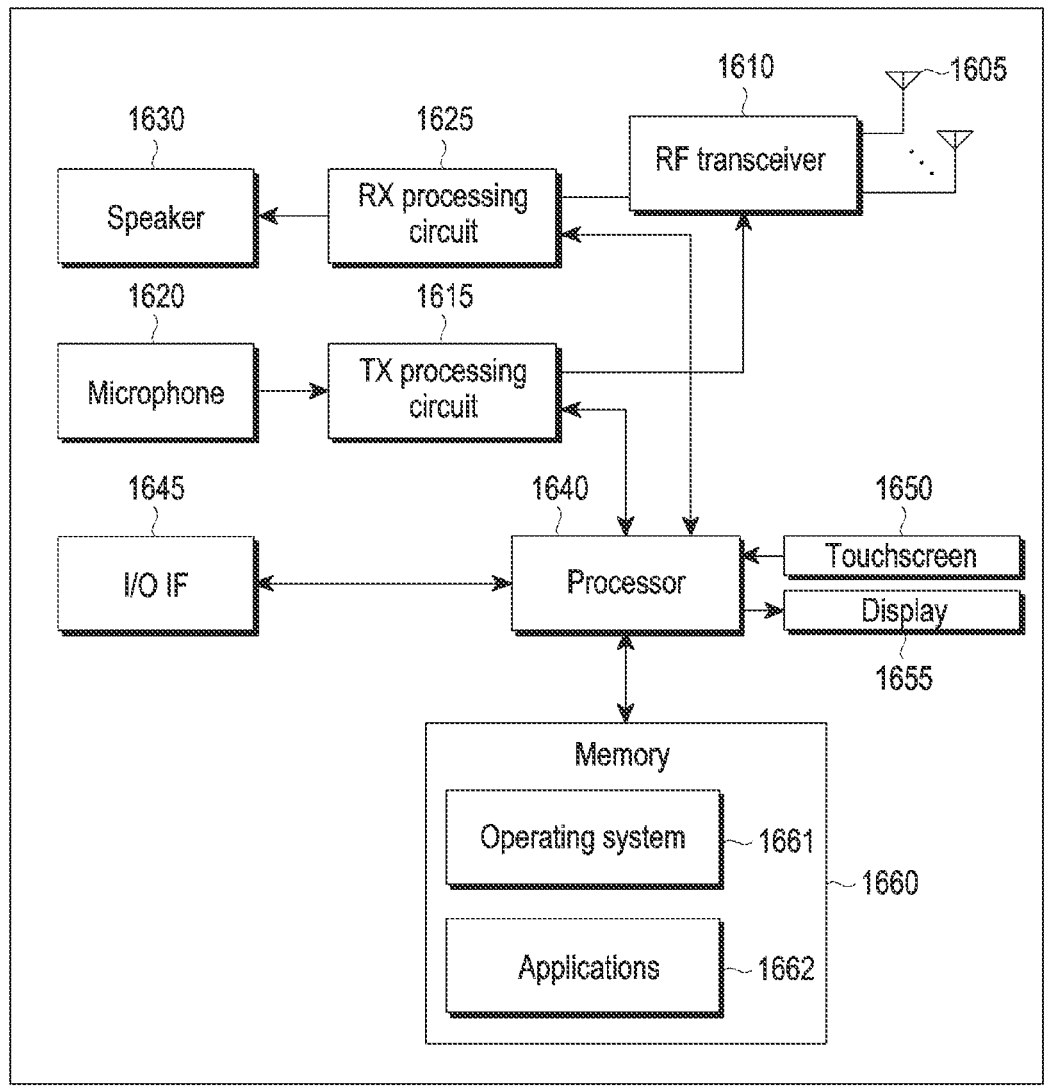
FIG. 16 schematically illustrates another example of an internal structure of a UE in a wireless communication system according to an embodiment.

FIG. 16 schematically illustrates an example of an internal structure of a UE in a wireless communication system according to an embodiment.

The embodiment of the UE illustrated in FIG. 16 is for illustrative purposes only, and thus, FIG. 16 does not limit the scope to any specific implementation of the UE.

As illustrated in FIG. 16, the UE includes an antenna 1605, a radio frequency (RF) transceiver 1610, a TX processing circuit 1615, a microphone 1620 and a receive (RX) processing circuit 1625. The UE also includes a speaker 1630, a processor (controller) 1640, an input/output (I/O) interface (IF) 1645, a touch screen 1650, a display 1655, and a memory 1660. The memory 1660 includes an operating system (OS) 1661 and one or more applications 1662.

The RF transceiver 1610 receives an input RF signal transmitted by the BS of the network from the antenna 1605. The RF transceiver 1610 down-converts an input RF signal to generate an intermediate frequency (IF) or baseband signal. The IF or baseband signal is transmitted to the RX processing circuit 1625, which filters, decodes, and/or digitizes the baseband or IF signal to generate a processed baseband signal. The RX processing circuitry 1625 transmits the processed baseband signal to the speaker 1630 (such as for voice data) or to the processor 1640 (such as for web browsing data) for further processing.

The TX processing circuit 1615 receives analog or digital voice data from the microphone 1620, or other output baseband data (such as web data, email, or interactive video game data) from the processor 1640. TX processing circuit 1615 encodes, multiplexes, and/or digitizes the output baseband data to generate a processed baseband or IF signal. The RF transceiver 1610 receives the processed baseband or IF signal output from the TX processing circuit 1615, and up-converts the baseband or IF signal into an RF signal transmitted through the antenna 1605.

The processor 1640 may include one or more processors or other processing devices, and may execute the OS 1661 stored in the memory 1660 to control the overall operation of the UE. In one example, the processor 1640 may control reception of downlink channel signals and transmission of uplink channel signals by RF transceiver 1610, RX processing circuitry 1625, and TX processing circuit 1615, in accordance with the principles of public notice. In some embodiments, processor 1640 includes at least one microprocessor or microcontroller.

The processor 1640 may control overall operations related to the operation of managing the network connection and session of the UE. That is, the processor 1640 may control the overall operation of the operation for managing the network connection and session as described with reference to FIGS. 1 to 15 as examples.

The processor 1640 may move data into or out of memory 1660 as required by the running process. The processor 1640 is configured to execute the applications 1662 based on the OS program 1661 or in response to signals received from base stations or an operator. In addition, the processor 1640 is coupled to the I/O interface 1645, which provides the UE with the ability to connect to other devices such as laptop computers and handheld computers. The I/O interface 1645 is a communication path between these accessories and the processor 1640.

The processor 1640 is also coupled to the touch screen 1650 and the display 1655. The operator of the UE may input data into the UE using the touch screen 1650. Display 1655 may be a liquid crystal display, light emitting diode display, or other display capable of rendering text and/or at least limited graphics, such as web sites.

The memory 1660 is coupled to processor 1640. A portion of the memory 1660 may include a random access memory (RAM), and the remaining portion of the memory 1660 may include a flash memory or other read-only memory (ROM).

Although FIG. 16 illustrates an example of a UE, various changes may be made to FIG. 16. For example, various components in FIG. 16 may be combined, further divided, or omitted, and other components may be added according to special needs. In addition, as a particular example, the processor 1640 may be partitioned into multiple processors, such as one or more central processing units (CPUs) and one or more graphics processing units (GPUs). In addition, although the UE is configured like a mobile phone or a smartphone in FIG. 16, the UE may be configured to operate as other types of mobile or stationary devices.

In some embodiment of this disclosure, a mobility management apparatus in a wireless communication system, the mobility management apparatus comprising: a transceiver; and at least one controller configured to control the transceiver, wherein the at least one controller is further configured to: receive, from a user equipment (UE), an attach request for a first network among at least two networks supported by the UE including first capability information including information related to a second network among the at least two networks, transmit, to the UE, an attach response indicating completion of attach to the first network, receive, from the UE, a session establishment request for the first network after transmitting the attach response, and establish a session for the first network through a session management apparatus supporting mobility between the first network and the second network, wherein the session establishment request includes information related to a session for the second network.

In addition, wherein the second network is in a disabled state.

In addition, wherein the first capability information includes information indicating that the second network is in a disabled state.

In addition, wherein the at least one controller is further configured to: in case that the second network is enabled after the session for the first network is established, receive, from the UE, an update request including second capability information including information related to at least one network in the enabled state among the at least two networks, and transmit, to the UE, an update response including information indicating support for updating session information for the second network.

In addition, wherein the information related to the session for the second network includes a session identifier (ID) for the second network.

In addition, wherein the information related to the session for the second network includes at least one of a bearer ID and a quality-of-service (QoS) parameter.

In some embodiment of this disclosure, a user equipment (UE) in a wireless communication system, the UE comprising: a transceiver, and at least one controller configured to control the transceiver, wherein the at least one controller is further configured to: transmit, to a mobility management apparatus, an attach request for a first network among at least two networks supported by the UE including first capability information including information related to a second network among the at least two networks, receive, from the mobility management apparatus, an attach response indicating completion of attach to the first network, transmit, to the mobility management apparatus, a session establishment request for the first network after receiving the attach response, and establish a session for the first network through a session management apparatus supporting mobility between the first network and the second network, wherein the session establishment request includes information related to a session for the second network.

In some embodiment of this disclosure, a method performed by a mobility management apparatus in a wireless communication system, the method comprising: receiving, from a user equipment (UE), an attach request for a first network among at least two networks supported by the UE including first capability information including information related a second network among the at least two networks; transmitting, to the UE, an attach response indicating completion of attach to the first network; receiving, from the UE, a session establishment request for the first network after transmitting the attach response; and establishing a session for the first network through a session management apparatus supporting mobility between the first network and the second network, wherein the session establishment request includes information related to a session for the second network.

In some embodiment of this disclosure, a method performed by a user equipment (UE) in a wireless communication system, the method comprising: transmitting, to a mobility management apparatus, an attach request for a first network among at least two networks supported by the UE including first capability information including information related to a second network among the at least two networks; receiving, from the mobility management apparatus, an attach response indicating completion of attach to the first network; transmitting, to the mobility management apparatus, a session establishment request for the first network after receiving the attach response; and establishing a session for the first network through a session management apparatus supporting mobility between the first network and the second network, wherein the session establishment request includes information related to a session for the second network.

On the other hand, the embodiments disclosed in the present disclosure and drawings are merely presented as specific examples to explain the technical contents and help the understanding, and are not intended to limit the scope of the disclosure. That is, it will be apparent to those of ordinary skill in the art to which the present disclosure pertains that other modifications based on the technical spirit can be implemented. In addition, each of the above embodiments may be operated in combination with each other as needed.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A mobility management entity in a wireless communication system, the mobility management entity comprising:
at least one controller configured to:
receive, from a user equipment (UE), an attach request for a first network among at least two networks supported by the UE including first UE network capability information indicating support of a second network among the at least two networks,
transmit, to the UE, an attach response indicating completion of attach to the first network,
receive, from the UE, a session establishment request for the first network, and establish a session for the first network through a session management entity supporting mobility between the first network and the second network, wherein, in case that UE network capability of the second network is disabled, the session establishment request includes information related to a session for the second network.

2. The mobility management entity of claim 1, wherein the attach request includes second UE network capability information indicating that the UE network capabiltiy of the second network is disabled.

3. The mobility management entity of claim 1, wherein the at least one controller is further configured to:

in case that the UE network capability of the second network is enabled after the session for the first network is established:

receive, from the UE, an update request including third UE network capability information indicating that the UE network capability of the second netowrk is enabled, and transmit, to the UE, an update response in response to the update request.

4. The mobility management entity of claim 1, wherein the information related to the session for the second network includes a session identifier (ID) for the second network.

5. A user equipment (UE) in a wireless communication system, the UE comprising:

at least one controller configured to:

transmit, to a mobility management entity, an attach request for a first network among at least two networks supported by the UE including first UE network capability information indicating support of a second network among the at least two networks, receive, from the mobility management entity, an attach response indicating completion of attach to the first network, transmit, to the mobility management entity, a session establishment request for the first network, and establish a session for the first network through a session management entity supporting mobility between the first network and the second network, wherein, in case that the UE network capability of the second network is disabled, the session establishment request includes information related to a session for the second network.

6. The UE of claim 5, wherein the attach request includes second UE network capability information indicating that the UE network capability of the second network is disabled.

7. The UE of claim 5, wherein the at least one controller is further configured to:

in case that the UE network capability of the second network is enabled after the session for the first network is established:

transmit, to the mobility management entity, an update request including third UE network capability information indicating that the UE network capabilitye of the second network is enabled, and receive, from the mobility management entity, an update response in response to the update request.

8. The UE of claim 6, wherein the information related to the session for the second network includes a session identifier (ID) for the second network.

9. A method performed by a mobility management entity in a wireless communication system, the method comprising:

receiving, from a user equipment (UE), an attach request for a first network among at least two networks supported by the UE including first UE network capability information indicating support of a second network among the at least two networks;

transmitting, to the UE, an attach response indicating completion of attach to the first network;

receiving, from the UE, a session establishment request for the first network; and establishing a session for the first network through a session management entity supporting mobility between the first network and the second network, wherein, in case that UE network capability of the second network is diabled, the session establishment request includes information related to a session for the second network.

10. The method of claim 9, wherein the information related to the session for the second network includes a session identifier (ID) for the second network.

11. The method of claim 9, wherein in case that the UE network capability of the second network is enabled after the session for the first network is established:

receiving, from the UE, an update request including third UE network capability information indicating that the UE network capability of the second network is enabled, and transmitting, to the UE, an update response in response to the update request.

12. A method performed by a user equipment (UE) in a wireless communication system, the method comprising:

transmitting, to a mobility management entity, an attach request for a first network among at least two networks supported by the UE including first UE network capability information indicating support of a second network among the at least two networks;

receiving, from the mobility management entity, an attach response indicating completion of attach to the first network;

transmitting, to the mobility management entity, a session establishment request for the first network; and establishing a session for the first network through a session management entity supporting mobility between the first network and the second network, wherein, in case that UE network capability of the second network is disabled, the session establishment request includes information related to a session for the second network.

13. The method of claim 12, wherein the information related to the session for the second network includes a session identifier (ID) for the second network.

14. The method of claim 12, wherein in case that the UE network capability of the second network is enabled after the session for the first network is established:

transmitting, to the mobility management entity, an update request including the UE network capability information indicating that the UE network capability of the second network is enabled, and receiving, from the mobility management entity, an update response in response to the update request.

* * * * *